R. A. CARTER.
METHOD OF SCARFING BARS OR RODS.
APPLICATION FILED AUG. 12, 1914.
1,146,612. Patented July 13, 1915.
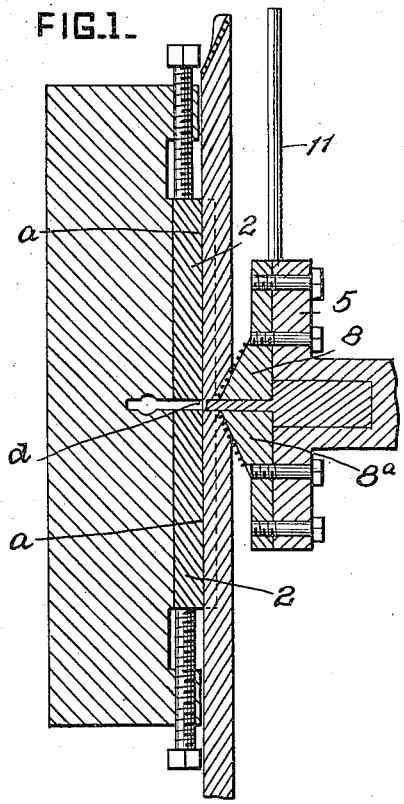
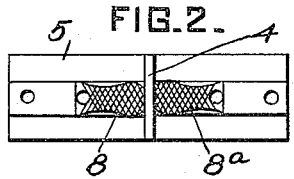
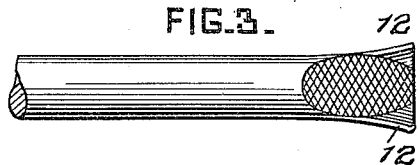
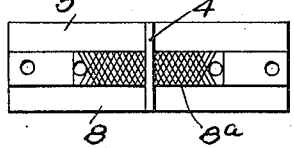
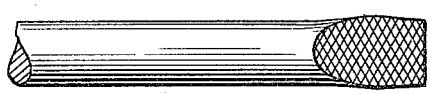
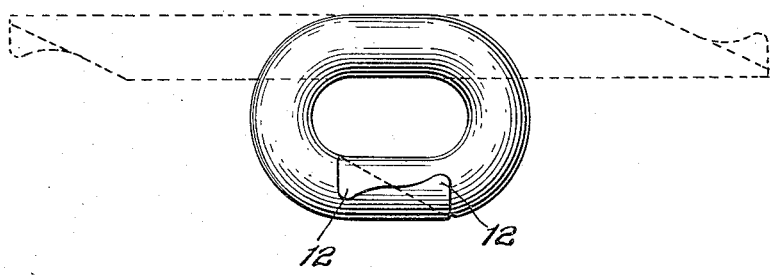
WITNESSES
INVENTOR
Robert A. Carter
by Danner S. Wolcott
Atty

UNITED STATES PATENT OFFICE.

ROBERT A. CARTER, OF PITTSBURGH, PENNSYLVANIA.

METHOD OF SCARFING BARS OR RODS.

1,146,612.  Specification of Letters Patent. Patented July 13, 1915.

Application filed August 12, 1914. Serial No. 856,382.

*To all whom it may concern:*

Be it known that I, ROBERT A. CARTER, residing at Pittsburgh, in the county of Allegheny and State of Pennsylvania, a citizen of the United States, have invented or discovered certain new and useful Improvements in Methods of Scarfing Bars or Rods, of which improvements the following is a specification.

It has heretofore been the practice in preparing the ends of bars or rods, or of link blanks preparatory to welding, to hammer out such ends one at a time, or to cut a bar or rod in a plane at an acute angle to its axis, thereby forming at one operation two beveled or scarfed surfaces. As this cutting also produces a flattening of the bar or rod it has been necessary to restore the contour of the bar by hammering.

The invention described herein relates to an improved method of preparing the ends of parts to be welded and has for its object the simultaneous shaping or scarfing of two surfaces; it is a further object of the invention to sever a bar or rod in plane at right angles to its axis and simultaneously shape or scarf the ends adjacent to the plane of division.

The invention has also for its object to provide the scarfed or beveled ends with lips adapted to partially infold or fit around when the beveled faces are placed together, the portions of the bar or blank in the rear of such bevels thereby not only increasing the surfaces in contact but also causing portions of one bar or link blank to grip around the end of the other bar or blank.

The invention is hereinafter more fully described and claimed.

In the accompanying drawing forming a part of this specification, Figure 1 is a sectional elevation of dies adapted to carry out my improved method and illustrating my improved method of simultaneously severing a bar into sections and scarfing the ends adjacent to the line of cut; Fig. 2 is an end elevation of the head carrying the shear blade and male dies; Fig. 3 is an elevation of a bar or blank having its scarfed ends provided with infolding lips; Fig. 4 is a view similar to Fig. 2 illustrating a form of male die for producing a plain flat scarf or bevel; Fig. 5 is an elevation of a bar having a plain flat bevel formed on its end; and Fig. 6 shows in dotted lines a link blank having its ends scarfed as shown in Fig. 3 and in full lines bent around to position for welding.

While not limiting the invention described and claimed herein as regards the means employed in the practice of the invention to any particular form or construction of such means it is preferred to employ the mechanism described and claimed in application Serial No. 856,381, filed August 12th, 1914, a sectional view of such mechanism being shown in Fig. 1, herein.

In the practice of my invention a properly heated bar or rod is fed lengthwise along grooves $a$ formed in the faces of blocks 2, 2, until the forward end of the rod abuts against a movable stop. The cross head 5 carrying the shear blade 4 and the male dies 8, $8^a$ is then moved to shear the bar and shape the ends adjacent to the line of division. As the cross-head moves forward a finger 11 thereon shifts the stop away from in front of the bar.

As will be seen by reference to Fig. 1, the blade 4 and dies 8, $8^a$ are so constructed and secured to the cross-head, that the blade will project beyond the dies and will therefore operate on and partially sever the bar before the dies begin their shaping operation. As the dies 8, $8^a$ form a wedge, they would if the bar were entirely severed, when they begin their shaping action, tend to force the separated pieces apart. As the dies in their action would cause a displacement and longitudinal flow of metal and consequent elongation, the bodily movement of the part while the beveling is being effected, must be prevented by means which will permit of the elongation of such parts. In my improved method the bodily movement during the initial shaping is prevented by the web $d$ or unsevered portion of the bar, as shown in Fig. 1. The protrusion of the blade beyond the faces of the dies adjacent thereto, is preferably equal to half the diameter of the bar or rod, but this distance may be varied to suit conditions. In order to prevent the bodily movement of the parts of the bar, when the blade has passed entirely through it, the operative faces of the dies are roughened so as to take a positive grip on the surfaces with which they are in contact, but such grip or engagement will permit the underlying portions of the metal to flow longitudinally.

By properly shaping the dies 8, $8^a$ and the portions of the grooves in the blocks 2, 2ª as described and shown in the application referred to, lips 12 may be formed along the edges of the beveled faces as shown in Figs. 3 and 6. These lips are adjacent to the ends of the scarf and by making the latter of sufficient length these lips will infold the portions of a bar or link immediately in the rear of the scarf. As will be readily understood, these lips will not only increase the areas of the surfaces to be welded, but as they pass part way around the bar or blank, they will positively grip the same, thereby increasing the security of the weld.

In the manufacture of links the ends of the sections or blanks must be oppositely scarfed, and hence the bar or rod should be turned 180 degrees on each forward feed.

I claim herein as my invention:

1. As an improvement in the art of preparing the ends of bars, etc., for welding, the method herein described which consists in partially severing the bar, subjecting the metal on each side of the line of cut to pressure of oppositely inclined surfaces, and continuing the cut in advance of the shaping or beveling operation.

2. As an improvement in the art of preparing the ends of bars, etc., for welding, the method herein described which consists in subjecting a bar or rod to transverse pressure of two oppositely inclined faces to form scarfed or beveled surfaces, causing portions of the metal at the edges of said scarfed or beveled surfaces to flow laterally to form lips, and imparting a curvature to the portions of the surfaces having the lips corresponding approximately to the curvature of the body of the bar.

In testimony whereof, I have hereunto set my hand.

ROBERT A. CARTER.

Witnesses:
G. G. TRILL,
THOS. B. JOYCE.